United States Patent [19]

Holoch et al.

[11] Patent Number: 4,829,106

[45] Date of Patent: May 9, 1989

[54] MOLDING MATERIALS BASED ON CURABLE UNSATURATED POLYESTER RESINS AND HAVING A LONG SHELF LIFE

[75] Inventors: Jan Holoch, Heidelberg; Alfred Guthmann, Worms; Hans-Juergen Christoph, Vellmar; Heinz B. Kemper, Kassel, all of Fed. Rep. of Germany

[73] Assignee: BASF Aktiengesellschaft, Ludwigshafen, Fed. Rep. of Germany

[21] Appl. No.: 97,130

[22] Filed: Sep. 16, 1987

[30] Foreign Application Priority Data

Sep. 19, 1986 [DE] Fed. Rep. of Germany ....... 3631838

[51] Int. Cl.$^4$ .............................................. C08L 67/06
[52] U.S. Cl. ..................................... 523/506; 522/18; 525/11; 525/14; 525/20; 525/48; 523/514; 523/515; 523/510
[58] Field of Search ...................... 523/506; 522/18; 525/48, 20, 14, 11; 528/303, 306

[56] References Cited

U.S. PATENT DOCUMENTS

| | | | |
|---|---|---|---|
| 3,028,360 | 4/1962 | Brooks | 523/506 |
| 3,061,580 | 10/1962 | Erickson | 525/14 |
| 3,360,589 | 12/1967 | Raichle | 523/506 |
| 3,576,909 | 4/1971 | Schmidle | 528/303 |
| 3,721,723 | 3/1973 | Heidel | 523/506 |
| 3,784,586 | 1/1974 | Thomas | 525/14 |

OTHER PUBLICATIONS

Bjorksten J., *Polyesters & Their Applications* pp. 163–164, Reinhold Publishing Corp. N.Y. 1956.

*Primary Examiner*—Patricia Short
*Attorney, Agent, or Firm*—Keil & Weinkauf

[57] ABSTRACT

Molding materials having a long shelf life consist of an unsaturated polyester resin, monomers, conventional additives and an inhibitor combination comprising a phenol or quinone, a phosphine or an ester of phosphorous acid, and a metal cation in the form of a salt or a complex which is soluble in the polyester resin.

3 Claims, No Drawings

MOLDING MATERIALS BASED ON CURABLE UNSATURATED POLYESTER RESINS AND HAVING A LONG SHELF LIFE

The present invention relates to resin materials which are based on unsaturated polyesters containing terminal maleic acid groups, copolymerizable monomers and a highly effective combination of inhibitors and have a long shelf life.

Curable unsaturated polyester resins tend to undergo premature gelling during storage, even when they contain no peroxide initiators or only peroxide initiators which decompose at relatively high temperatures. To prolong the shelf life, inhibitors, generally based on hydroquinone derivatives, are therefore added to the resin materials. This gives storage times of more than 6 months in the case of conventional polyester resins.

According to East German Pat. No. 2,001,366, the addition of phenolic inhibitors together with esters of phosphorous acid results in a long shelf life even at elevated temperatures.

Particularly serious is the problem of premature gelling in the case of resin materials based on unsaturated polyesters containing terminal maleic acid groups. Resins of this type are distinguished by the fact that they can be used to produce cured moldings having particularly good mechanical properties; on the other hand, terminal maleic acid groups can undergo ester cleavage in an equilibrium reaction to form maleic anhydride, which reacts with monomeric styrene to give a charge-transfer complex, which presumably initiates the premature polymerization. This cleavage is not possible in the case of terminal fumaric acid groups since, under similar conditions, fumaric acid does not form an anhydride. However, conventional unsaturated polyesters contain, in addition to terminal hydroxyl groups, virtually exclusively terminal fumaric acid groups since the maleic acid used isomerizes to give about 95% of fumaric acid at the conventional high polycondensation temperatures (above 160° C.). A polyester prepared from maleic anhydride and a glycol contains, for example, only about 2.5% of terminal maleic acid groups.

It is an object of the present invention to improve the shelf life of resin materials based on unsaturated polyesters containing more than 10%, based on the total number of terminal groups, of terminal maleic acid groups.

We have found that this object is achieved, according to the invention, by the combined use of conventional phenolic inhibitors, a phosphine or ester of phosphorous acid and a metal salt or complex which is soluble in the resin.

The present invention accordingly relates to molding materials which have a long shelf life and consist of A. an unsaturated polyester which contains more than 10%, preferably more than 30%, of terminal maleic acid groups,
B. copolymerizable monomers,
C. conventional additives and assistants,
D. 50–1,000 ppm, based on A+B, of a phenol or quinone,
E. 100–20,000 ppm, based on A+B, of a phosphine or an ester of phosphorous acid, and
F. 2–200 ppm, based on A+B, of a metal cation in the form of a salt or complex which is soluble in the resin A+B.

Regarding the individual components, the following may be stated:

A. Unsaturated polyesters containing terminal maleic acid groups are obtained by a multistage process. First, a saturated or unsaturated polyester is prepared in a conventional manner by polycondensation of dicarboxylic acids and diglycols. This is carried out by conventional procedures (melt condensation, removal of substances, single-stage and multistage procedures, addition of esterification catalysts, transesterification, for example of dimethyl terephthalate). The condensation is carried out to a low acid number (<50, preferably <20). The hydroxyl number of the polyester is determined, and the number of free hydroxyl groups is calculated from this. Some or all of the free hydroxyl groups are then reacted with maleic anhydride at low temperatures (below −140° C.). The reaction takes place spontaneously and is complete after a few hours. At this relatively low temperature, there is scarcely any isomerization of maleic half ester to fumaric half ester; thus, depending on the amount of maleic anhydride used, unsaturated polyesters containing 10–100% of terminal maleic acid groups are obtained.

If a solvent which reduces the viscosity is present during the reaction of the free hydroxyl groups with maleic anhydride, this reaction can be carried out at even lower temperatures (about 70° C.). If it is intended to prepare an unsaturated polyester having a high content of terminal maleic acid groups, an excess of glycol is used during the condensation in order to obtain a hydroxyl-terminated polyester.

Suitable starting polyesters are the conventional polycondensates of polybasic, in particular dibasic, carboxylic acids and their esterifiable derivatives, in particular anhydrides which are linked via ester bonds to polyhydric, in particular dihydric, alcohols and may furthermore contain radicals of monobasic carboxylic acids and/or radicals of monohydric alcohols and/or radicals of hydroxycarboxylic acids.

When the dibasic carboxylic acids used are unsaturated, the reaction with maleic anhydride gives unsaturated polyesters which, in addition to the terminal maleic acid groups, also contain middle maleic and fumaric acid groups.

B. Suitable copolymerizable, ethylenically unsaturated monomeric compounds are the allyl and, preferably, vinyl compounds usually used for the preparation of unsaturated polyester resins, styrene being preferred. Component B is present in the polyester molding materials in general in an amount of from 10 to 80, preferably from 20 to 70, % by weight, based on the total weight of A+B.

C. Examples of conventional additives and assistants are reinforcing agents and fillers, such as glass fibers, carbon fibers and organic fibers in the form of rovings, mats or woven fabrics, glass spheres, hollow glass microspheres, aluminum hydroxide, silica, chalk, talc, sand and sawdust, pigments, such as titanium dioxide, thickeners, such as magnesium oxide or polyisocyanates, shrinkage-reducing additives, such as polystyrene, polyvinyl acetate or polymethyl methacrylate, elastifiers, such as polyurethanes or diene rubbers, flameproofing additives, such as decabromodiphenyl ether and chloroparaffin, and thixotropic agents, lubricants and solvents.

Finally, the molding materials can contain the conventional initiators, suitable initiators for heat curing being peroxides which decompose at high temperatures, suitable ones for cold curing being peroxides which decompose at low temperatures, in combination with cobalt or amine accelerators, and suitable ones for photocuring being photoinitiators, such as benzil ketals, benzoin ethers, acylphosphine oxides or disulfides, preferably in amounts of from 0.1 to 1% by weight, based on A+B.

D. Examples of suitable phenolic inhibitors are hydroquinone, methylhydroquinone and dimethyl- and trimethyl-hydroquinones. Quinone and quinone derivatives are also suitable. They are used in amounts of from 50 to 1,000 ppm, preferably from 100 to 500 ppm, based on the weight of A+B.

E. Components E are organic esters of phosphorous acid and organic phosphines, eg. triphenylphosphine, tributylphosphine, tri-p-toluylphosphine, trimethyl phosphite, triethyl phosphite, triisopropyl phosphite and triphenyl phosphite.

They are used in amounts of from 100 to 20,000 ppm, esters of phosphorous acid preferably in amounts of 1,000-10,000 ppm and phosphines preferably in amounts of 200-1,000 ppm, based on the weight of A+B.

F. The novel molding materials having a long shelf life contain from 2 to 200 ppm, preferably from 5 to 50 ppm, based on the weight of A+B, of a metal cation in the form of a salt or complex which is soluble in the resin A+B and is preferably organic. Particularly suitable cations are $Na^+$, $K^+$, $Li^+$, $Cu^+$, $Cu^{++}$, $Pb^{++}$, $Fe^{++}$, $Co^{++}$, $Ni^{++}$ and $Zn^{++}$. Preferred salts and complexes are sodium methylate, potassium formate, lithium chloride, copper(I) chloride, lead naphthenate, iron naphthenate, copper naphthenate, cobalt naphthenate, nickel naphthenate, zinc naphthenate, cobalt octoate, copper octoate, iron octoate and copper acetylacetonate. A solution of Soligen copper (copper naphthenate) in styrene, containing 1% of $Cu^{++}$, is particularly preferred.

The novel molding materials have a long shelf life. They can be converted to moldings having very good mechanical properties by a conventional method such as cold curing, heat curing or photocuring, if necessary after the addition of initiators.

A special advantage of the preferred inhibitor combination of hydroquinone, triphenylphosphine and copper naphthenate is that cold curing with methyl ethyl ketone peroxide and cobalt naphthenate is also accelerated.

In the Examples, parts and percentages are by weight.

EXAMPLE 1

Resilient coating material based on an unsaturated polyester containing about 95% of terminal maleic acid groups (a) Preparation of the unsaturated polyester resin 416 parts of neopentylglycol and 438 parts of adipic acid are esterified to an acid number of 10 in the course of 20 hours at 190° C. while stirring and passing over nitrogen. The kettle temperature is reduced to 140° C., and 98 parts of maleic anhydride are added. At this temperature, stirring is continued for a further 3 hours. After the addition of 0.13 part of hydroquinone, 800 parts of the unsaturated polyester are dissolved in 430 parts of styrene below 120° C.

(b) Preparation of the elastifying polyurethane component B 1,000 parts of a prepolymer of isophorone diisocyanate with butane-1,4-diol, containing from 15 to 17% of free isocyanate groups and having a mean molecular weight of 250, are reacted with 2,716 parts of polytetramethylene ether glycol having a molecular weight of 950–1,000 in the presence of dibutyltin dilaurate as a reaction accelerator, as a 60% strength solution in styrene. After the residual content of isocyanate groups has been checked, the free isocyanate groups are saturated with the required amount of amine (H equivalent weight 120–200), as a 20% strength solution in styrene.

(c) Preparation of the coating material 1,000 parts of polyester resin (a), 300 parts of polyurethane component (b), 200 parts of aluminum hydroxide, 50 parts of titanium dioxide (rutile pigment), 20 parts of paraffin, 5 parts of a thixotropic agent and 0.2 part of hydroquinone are mixed thoroughly in a mixer having a high shearing rate.

Further inhibitors are added to the coating material. The shelf lives are measured at 70° C., in tin cans (80% full).

| Experiment | Additional inhibitors | Shelf life (70° C.) (d) |
|---|---|---|
| 1 | — | 9 |
| 2 | 0.14% of Soligen copper (containing 1% of Cu) | 12 |
| 3 | 1% of triphenyl phosphite | 10 |
| 4 | 1% of triphenyl phosphite + 0.14% of Soligen copper (containing 1% of Cu) | 59 |
| 5 | 0.2% of LiCl (in ethanol; 1.6% of Li) | 11 |
| 6 | 1% of triphenylphosphite + 0.2% of LiCl (in ethanol; 1.6% of Li) | 59 |

EXAMPLE 2

Unsaturated polyester resin containing about 53% of terminal maleic acid groups and additionally containing middle double bonds.

392 parts of maleic anhydride, 1,184 parts of phthalic anhydride and 1,034 parts of propylene glycol are esterified to an acid number of 25 and a hydroxyl number of 60 in the course of 15 hours at 200° C. while stirring and passing over nitrogen. The temperature is reduced to 140° C., and 196 parts of maleic anhydride and 0.23 part of hydroquinone are added. Stirring is then continued for 3 hours at this temperature. After 0.16 part of hydroquinone has been added, 2,300 parts of this unsaturated polyester are dissolved in 1,346 parts of styrene. After the addition of further inhibitors, the shelf lives are tested at 80° C. in glass ampoules (80% full).

| Experiment | Additional inhibitors | Shelf life (80° C.) (h) |
|---|---|---|
| 1 | — | 1.5 |
| 2 | 0.1% of triphenylphosphine | 1.5 |
| 3 | 1% of triphenyl phosphite | 3 |
| 4 | 0.1% of triphenylphosphine + 0.14% of Soligen iron (1% of Fe) | 5 |
| 5 | 1% of triphenyl phosphite + 0.14% of Soligen iron (1% of Fe) | 11 |
| 6 | 0.1% of triphenylphosphine + 0.14% of Soligen copper (1% of Cu) | 42 |
| 7 | 1% of triphenyl phosphite + 0.14% of Soligen copper (1% of Cu) | 80 |

Experiments 4–7 are according to the invention. They show the superiority of copper to iron as a cation.

Curing is effected with 2% of methyl ethyl ketone peroxide (MEKP-LA 3) and 0.2% of cobalt naphthenate (1% of Co). The time taken for the temperature to increase from 25 to 35° C. (gelling time, GT), the time taken to reach the maximum temperature (curing time, CT) and the maximum temperature ($t_{max}$) are measured.

| Additional inhibitors | GT (min) | CT (min) | $t_{max}$ (°C.) |
|---|---|---|---|
| — | 32 | 57 | 85 |
| 0.1% of triphenylphosphine + 0.14% of Soligen copper (1% of Cu) | 23 | 41 | 110 |

We claim:

1. A molding material having a long shelf life which comprises:

A. an unsaturated polyester which contains more than 10%, based on the total number of terminal groups, of terminal maleic acid groups,
    B. copolymerizable monomers,
    D. 50–1,000 ppm, based on A+B, of a phenol or quinone, and
    E. 100–20,000 ppm, based on A+B, of a phosphine or an ester of phosphorous acid, which contains
    F. 2-200 ppm, based on A+B, of the metal cations $Li^+$ or $Cu^{++}$ in the form of a salt or complex which is soluble in the resin A+B.

2. The molding material of claim 1, wherein component F is divalent copper.

3. The molding material of claim 1, wherein component F is copper naphthenate.

* * * * *